(12) United States Patent
Charbon

(10) Patent No.: US 7,173,230 B2
(45) Date of Patent: Feb. 6, 2007

(54) ELECTROMAGNETIC WAVE DETECTION ARRANGEMENT WITH CAPACITIVE FEEDBACK

(75) Inventor: Edoardo Charbon, Berkeley, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

(21) Appl. No.: 10/236,490

(22) Filed: Sep. 5, 2002

(65) Prior Publication Data

US 2003/0042406 A1 Mar. 6, 2003

Related U.S. Application Data

(60) Provisional application No. 60/317,578, filed on Sep. 5, 2001.

(51) Int. Cl.
*H03F 3/08* (2006.01)

(52) U.S. Cl. .................................. 250/214 A; 330/308

(58) Field of Classification Search ............ 250/214 A, 250/214 LA, 214 LS, 214 C, 214 R, 208.1; 330/59, 110, 308; 348/241, 308; 327/514
See application file for complete search history.

(56) References Cited

U.S. PATENT DOCUMENTS

| | | |
|---|---|---|
| 3,857,022 A | 12/1974 | Rebane et al. |
| 4,187,492 A | 2/1980 | Delignieres |
| 4,312,053 A | 1/1982 | Lipsky |
| 4,333,170 A | 6/1982 | Mathews et al. |
| 4,376,301 A | 3/1983 | Roberts |
| 4,686,655 A | 8/1987 | Hyatt |
| 4,716,542 A | 12/1987 | Peltz et al. |
| 4,902,886 A * | 2/1990 | Smisko .................. 250/214 R |
| 4,956,824 A | 9/1990 | Sindeband et al. |
| 4,980,870 A | 12/1990 | Spivey et al. |

(Continued)

FOREIGN PATENT DOCUMENTS

EP 0233464 A 8/1987

(Continued)

OTHER PUBLICATIONS

Naoshi Matsuo et al., "Speaker Position Detection System Using Audio-visual Information," Dec. 1999, XP 000931599, pp. 214-220.

(Continued)

*Primary Examiner*—Thanh X. Luu
(74) *Attorney, Agent, or Firm*—Hickman Palermo Truong & Beck LLP; Edward A. Becker

(57) ABSTRACT

An approach is provided for detecting EM waves using a photodetector coupled to an amplifier stage. The amplifier stage uses capacitive feedback to reduce or cancel intrinsic capacitance of the photodetector. A variety of capacitance structures may be used to provide the capacitive feedback such as shielded capacitors and capacitor arrays. The amplifier stage may be either single-ended or fully differential, depending upon the requirements of a particular application. Noise cancellation circuitry may also be included to reduce noise and offset sources present in the amplifier stage. The approach is applicable to a variety of contexts and applications. Example applications include, without limitation, detection of both brightness and Time of Flight (TOF) in 3D sensing applications. The approach may also be used to detect EM wave intensity in 2D sensing systems and, in general, for any application requiring simultaneously high speed and high sensitivity EM detection.

15 Claims, 6 Drawing Sheets

U.S. PATENT DOCUMENTS

| | | | |
|---|---|---|---|
| 5,056,791 A | | 10/1991 | Poillon et al. |
| 5,057,682 A | * | 10/1991 | Michon et al. ......... 250/214 C |
| 5,099,456 A | | 3/1992 | Wells |
| 5,166,905 A | | 11/1992 | Currie |
| 5,174,759 A | | 12/1992 | Preston et al. |
| 5,304,814 A | * | 4/1994 | Markham .................... 250/573 |
| 5,363,055 A | * | 11/1994 | Ribner .......................... 330/9 |
| 5,448,056 A | * | 9/1995 | Tsuruta ................... 250/214 A |
| 5,573,077 A | | 11/1996 | Knowles |
| 5,617,371 A | | 4/1997 | Williams |
| 5,825,033 A | | 10/1998 | Barrett et al. |
| 6,002,435 A | | 12/1999 | Yamamoto et al. |
| 6,025,589 A | * | 2/2000 | Aswell et al. .............. 250/226 |
| 6,097,195 A | * | 8/2000 | Ackland et al. ............ 324/719 |
| 6,417,503 B1 | * | 7/2002 | Tsuruta ................... 250/214 A |
| 6,441,357 B2 | * | 8/2002 | Ang et al. ................ 250/208.1 |
| 6,448,064 B1 | * | 9/2002 | Vo-Dinh et al. ......... 435/287.2 |
| 6,459,078 B1 | * | 10/2002 | Fowler ................... 250/214 A |
| 6,501,322 B1 | * | 12/2002 | Bidenbach et al. ........ 327/336 |
| 6,504,572 B2 | * | 1/2003 | Kramer et al. .............. 348/246 |
| 2001/0008422 A1 | * | 7/2001 | Mizuno et al. ............. 348/302 |

FOREIGN PATENT DOCUMENTS

| | | |
|---|---|---|
| EP | 042500 A2 | 4/1991 |
| EP | 0629964 A1 | 12/1994 |
| EP | 0982676 A1 | 3/2000 |
| EP | 1039365 A2 | 9/2000 |
| EP | 1045586 A2 | 10/2000 |
| WO | WO 84/00427 A1 | 2/1984 |
| WO | WO 00/19705 A | 4/2000 |

OTHER PUBLICATIONS

IBM Corp., "Virtual Keyboard" ISB Tech Disclosure Bulletin, Mar. 1990, vol. 32, No. 10B, XP 000097915, pp. 359-360.

A. E. Savakis et al., "Restoration of Real Defocused Images Using Blur Models Based on Geometrical and Diffraction Optics," 1991, IEEE, pp. 919-922.

Ren C. Luo et al., "Defocusing Blur Restoration in Natural Scene Images for Factual Analysis," Nov. 15, 1993, IEEE, pp. 1377-1381.

"Sonar", encyclopedia article from *Wikipedia* (electronic publication, no date).

* cited by examiner

ELECTROMAGNETIC WAVE DETECTION ARRANGEMENT WITH CAPACITIVE FEEDBACK

RELATED APPLICATION

This application claims priority from U.S. Provisional Patent Application No. 60/317,578, entitled "HIGH SENSITIVITY, HIGH SPEED, LOW NOISE CONVERSION TECHNIQUES FOR CMOS IMAGING," filed Sep. 5, 2001 by Edoardo Charbon, the contents of which are incorporated herein by reference in their entirety for all purposes.

FIELD OF THE INVENTION

The invention relates to electromagnetic (EM) wave detection systems, and more specifically, to an approach for detecting EM waves that provides improved performance and reproducibility.

BACKGROUND OF THE INVENTION

Sensors for the detection of two-dimensional and three-dimensional images are used in numerous applications, such as commercial video, medical applications, astronomy and instrumentation. The particular type of EM wave detection employed varies depending upon the context and requirements of a particular application, such as wavelength and acquisition speed. For example, in astronomy, light images are extremely dim, but acquisition times may be on the order of seconds, minutes or even hours. In medical applications, there are significant constraints on the size and power dissipation of sensors to allow insertion in the human body or, in general the use in a sterile environment. In commercial video, generally the most stringent constraints are acquisition time, quality of the image and overall device cost.

For EM wave detection in the visible, ultraviolet (UV) and infrared (IR) wavelengths, EM waves are typically detected using photo elements such as silicon photodiodes or photogates. The fundamental measurement principle is based on integrating a current generated by the photoelement across a capacitor, usually the parasitic capacitor of the photoelement. At the end of the integration period, the voltage present across the capacitor is read out, for example, through a sequential charge transfer used in charge coupled devices (CCDs).

One of the limitations of such systems is the apparent correlation between integration time and sensitivity of detection. The area of the photodiode determines both the absolute value of the current being generated for a given irradiation intensity per unit area and its inner parasitic capacitance. Increasing the size of the detector increases the current generated for a given intensity, but doing so increases the inner capacitance (which is used as an integrator) of the device. This in turn increases the number of charges (and time) needed to reach a measurable voltage level.

FIG. 1A is a block diagram that depicts a conventional sensor chip 100 that includes a pixel array 102 and associated circuitry for transferring the voltage accumulated in every pixel to the outside of pixel array 102. In the present example, pixel array 102 includes a row decoder module 104, a column decoder and bias module 106, an amplification and sampling module 108, an A/D conversion module 110 and an input/output (I/O) module 112. Random access to every pixel in pixel array 102 is performed by selecting a given row through row decoder 104 and by transferring the charge in all the pixels in this row to a sampling device, such as amplification and sampling module 108 (one for each column), that can be sequentially or simultaneously accessed. The voltage associated with the pixel charge is then accurately amplified and timely converted to a digital code by amplification and sampling module 108 and A/D conversion module 110, respectively. The resulting code can then be transmitted to the exterior of sensor chip 100 through appropriate logic.

FIG. 1B is a block diagram that depicts a conventional pixel arrangement 150 based on a photodiode. When the reset line (RST) is de-asserted, i.e., changed from a logic LOW to a logic HIGH, a reset transistor 152 stops conducting and a photodiode 154 is placed in reception mode. A reception mode consists of a state in which the photodiode is in reverse bias and it is thus ready to generate a current when incident photons are absorbed by its substrate. Reset transistor 152 injects a spurious current due to the accumulation of charges in its channel during the on phase that need be evacuated from the channel. The spurious current from reset transistor 152 charges $C_d$ and other parasitic capacitances at node $V_O$ resulting in a sampled error voltage. An additional source of error voltage is due to the kT/C effect caused by $C_d$. kT/C effects are described in more detail hereinafter. The error voltage is conventionally canceled through a process known as (un)correlated double-sampling. This process consists of sampling $V_O$ through a shutter transistor 156, via a SHUT signal, before the EM waveform intensity $I_{WF}$ is received and subtracted from the final sampled voltage resulting from the integration process. In some cases it may be advantageous to sample the final voltage resulting from the integration process first, reset the pixel and again sample the error voltage. The latter is known as uncorrelated douple-sampling.

Assuming a square pulse of current generated by photodiode 104, the final voltage accumulated in the parasitic capacitances connected to node $V_O$ are as follows:

$$V_{OUT}(t_i) = I_d T_H / C_d \qquad (1)$$

However, since for a given intensity $I_{WF}$, $I_d$ is directly proportional to the area of photodiode 154 ($A_d$) and $C_d$ is directly dependent on $A_d$, then, $$V_{OUT}(t_1) \propto I_{WF} T_H, \qquad (2)$$

where the only parameters that can be modified for a given technology are the pulse duration and intensity. Hence, a long integration time must be used to obtain a sufficiently strong signal, making this arrangement generally unsuitable for fast and dim EM waveforms.

Based on the foregoing, there is a need for improved EM wave detection systems. There is a particular need for improved EM wave detection systems that are suitable for low intensity EM wave applications while maintaining reasonably short acquisition times. There is yet another need for improved EM wave detection systems that are reproducible and therefore suitable for mass production and use in large pixel matrix applications.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are, depicted in block diagram form in order to avoid unnecessarily obscuring the invention. Various aspects and embodiments of the invention are described in the following sections: (1) overview; (2) capacitive feedback arrangements; (3) capacitance structures, (4) noise cancellation; (5) capacitive feedback combined with noise cancellation; and (6) implementation mechanisms.

1. Overview

An approach is provided for detecting EM waves using a photo detector coupled to an amplifier stage. The amplifier stage uses capacitive feedback to reduce or cancel intrinsic capacitance of the photo detector. A variety of capacitance structures may be used to provide the capacitive feedback such as shielded capacitors and capacitor arrays. The amplifier stage may be either single-ended or fully differential, depending upon the requirements of a particular application. Noise cancellation circuitry may also be included to reduce noise and offset sources present in the amplifier stage.

The approach is applicable to a variety of contexts and applications. Example applications include, without limitation, detection of both brightness and Time of Flight (TOF) in 3D sensing applications. The approach may also be used to detect EM wave intensity in 2D sensing systems and, in general, for any application requiring simultaneously high speed and high sensitivity EM detection.

2. Capacitive Feedback Arrangements

Figure 1A:
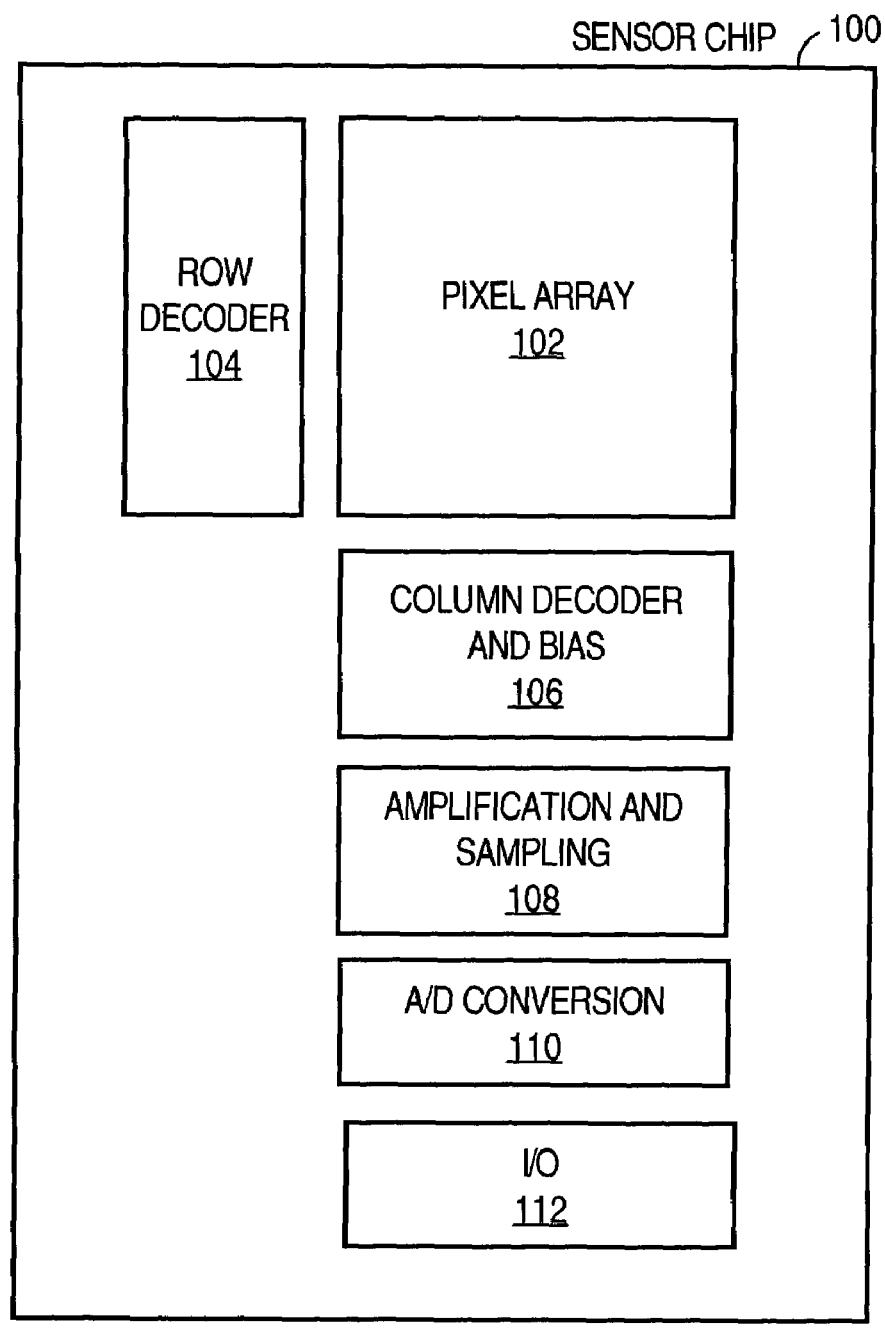
FIG. 1A is a block diagram that depicts a conventional sensor chip.
Figure 1B:
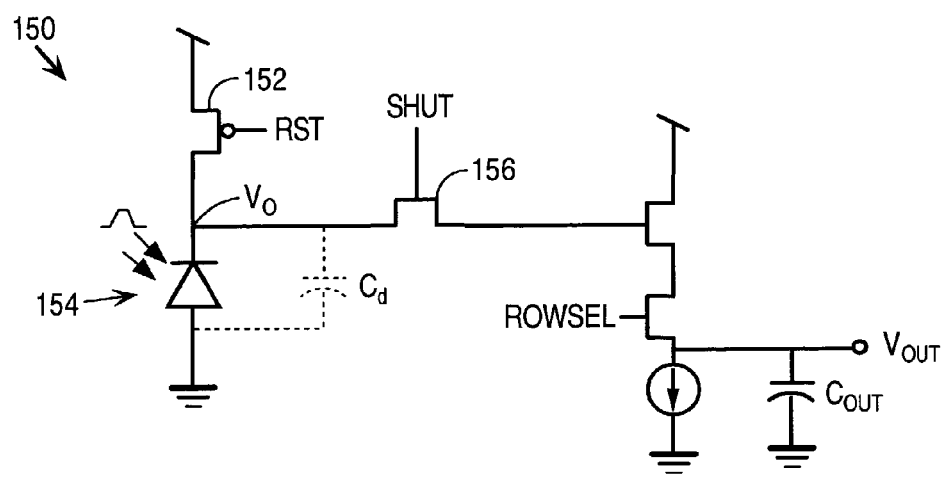
FIG. 1B is a block diagram that depicts a conventional pixel arrangement based on a photodiode.
Figure 2:
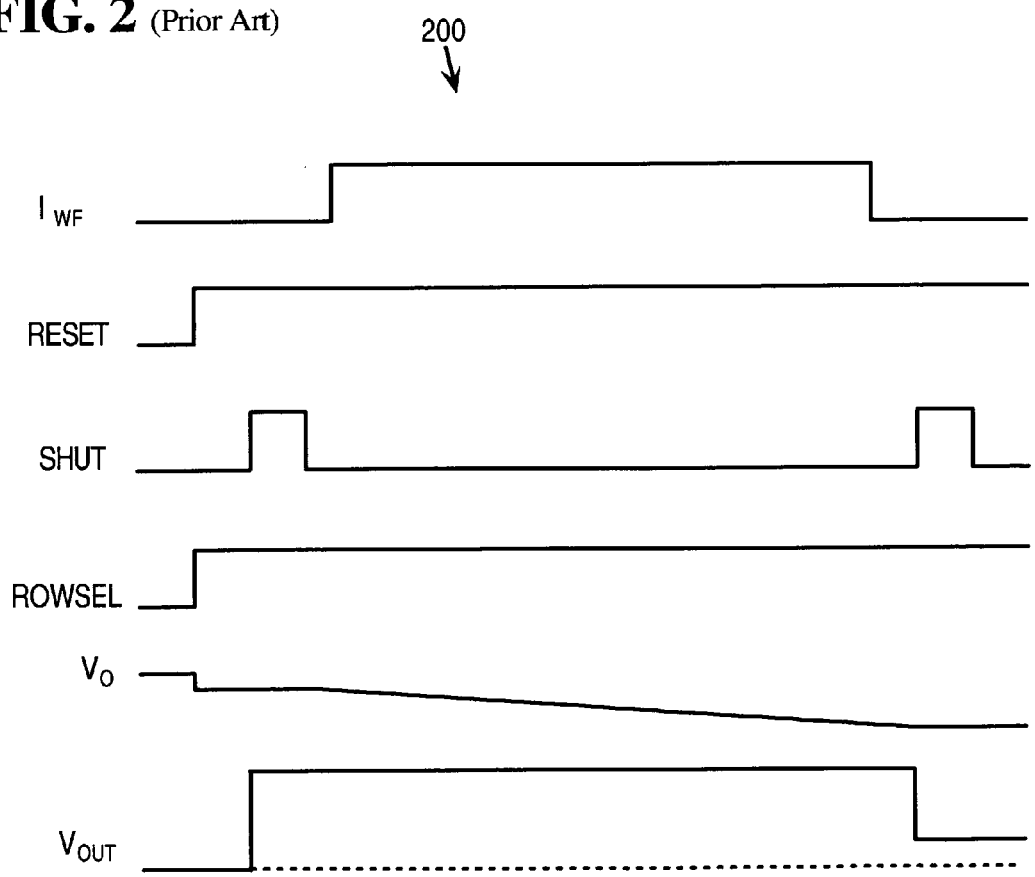
FIG. 2 is a block diagram that depicts various signal levels associated with the operation of the conventional pixel arrangement of FIG. 1.
Figure 3:
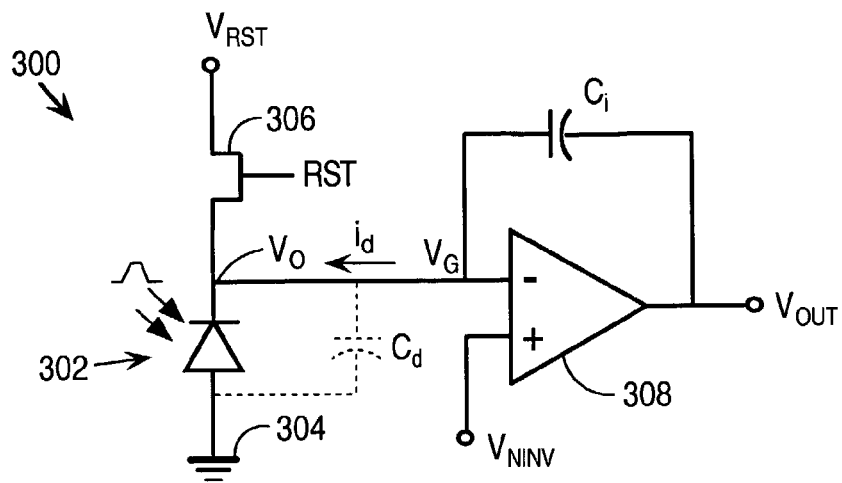
FIG. 3 is a block diagram that depicts a detection circuit arrangement configured in accordance with an embodiment of the invention.

FIG. 3 is a block diagram that depicts a detection circuit arrangement 300 configured in accordance with an embodiment of the invention. Arrangement 300 includes a photodetector, in the form of a photodiode 302, connected between a ground potential 304 and a node $V_O$. Although embodiments of the invention are depicted in the figures and described herein in the context of photodiodes, the invention is not limited to photodiodes and any type of photodetector may be used, depending upon the requirements of a particular application. Example photodetector types include, without limitation, silicon-based photo detectors, silicon-on-insulator (SOI) photodetectors and gallium arsenide photodetectors. As another example, photodiode 302 may be implemented as a lateral or vertical bipolar transistor and may be implemented in any type of technology, such as NMOS, CMOS or bi-CMOS. As is described in more detail hereinafter, the invention is also applicable to other types of photodetectors, such as photogates. Photogates are modified MOS transistors that capture electrical charges generated through the photoelectric effect just as photodiodes. The difference resides in the mechanism by which the collected charges are accumulated and delivered to the exterior, i.e., via the channel forming under the gate.

A reset transistor 306 is connected between node $V_O$ and a reset voltage supply $V_{RST}$. Reset transistor 306 may be implemented as any type of transistor device using any type of technology, depending upon the requirements of a particular application. For example, using an NMOS device for reset transistor 306 provides a "strong off", which may reduce leakage currents, and smaller structure size compared to a PMOS device. Other types of switching elements, such as conventional switches, may be used in place of reset transistor 306. In the present example, a reset signal (RST) is applied to the gate of reset transistor 306.

Arrangement 300 includes an operational amplifier 308 with its inverting input connected to node $V_O$ and a voltage $V_{NINV}$ applied to its non-inverting input. Voltage $V_{NINV}$ may be the same as $V_{RST}$, or different, depending upon the requirements of a particular application. A feedback capacitor $C_i$ is coupled between the output $V_{OUT}$ and inverting input of operational amplifier 308.

In operation, reset transistor 306 establishes a reverse bias of photodiode 302 to a specified voltage $V_G$. When an EM wave reaches photodiode 302, a current pulse is generated across photodiode 302. Assuming that operational amplifier 308 has a sufficiently large open loop gain $A_G$, then operational amplifier 308 functions as an ideal integrator and the current generated by photodiode 302 is used almost entirely to charge feedback capacitor $C_i$, thus producing a measurable voltage at the output $V_{OUT}$ of operational amplifier 308 at the end of the integration period as follows:

$$V_{OUT} = (1/C_i) \int_0^{\tau_i} i_d \, dt \quad (3)$$

where $i_d(t)$ is the intrinsic current across photodiode 302. As is apparent from equation (3), the output voltage $V_{OUT}$ of operational amplifier 308 is independent of parasitic capacitance $C_d$ of photodiode 302.

Figure 4:
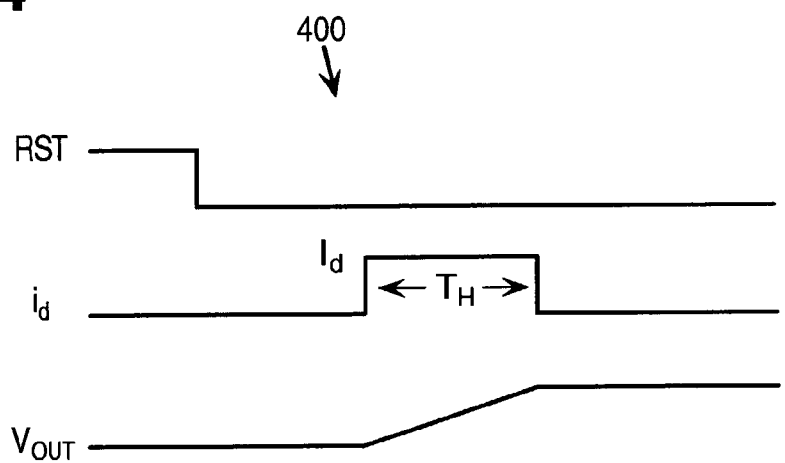
FIG. 4 is a block diagram that depicts example signal levels associated with the operation of the detection circuit arrangement of FIG. 3.

FIG. 4 is a block diagram 400 that depicts example signal levels associated with the operation of arrangement 300. Reset signal (RST) is initially set to a logic HIGH, causing reset transistor 306 to conduct and setting the voltage level at the inverting input of operational amplifier 308 to $V_G$. Feedback capacitor $C_i$ is charged and $V_{OUT}$ increases accordingly. RST changes to a logic LOW, turning OFF reset transistor 306, and allowing photodiode 302 to be active.

Sometime later, a pulse of EM radiation is received by photodiode 302, causing photodiode 302 to conduct current $i_d$. As photodiode 302 conducts current, feedback capacitor $C_i$ is charged and $V_{OUT}$ increases over the duration of the EM radiation received by photodiode 302. For an $i_d$ of a pulse width $T_H$ and intensity $I_d$, then $V_{OUT}$ at time $t_1$ is determined by:

$$V_{OUT}(t_1) = I_d T_H / C_i \quad (4)$$

For $I_d=10$ nA, $T_H=10$ ns and $C_i=10$ fF, then $V_{OUT}(t_1)=10$ mV. Assume the area of photodiode 302 is doubled, thus causing $I_d$ to double to 20 nA. In arrangement 300, $V_{OUT}(t_1)$ also doubles to 20 mV. In a conventional sensor arrangement, doubling the detector area does not increase the output voltage $V_{OUT}(t_1)$ because the accumulated voltage across the detector is attributable only to the intrinsic current on the parasitic capacitance $C_d$ of the detector. This example highlights one of the benefits of the present approach, namely, that the decoupling of the area and parasitic capacitance of a detector allows an increase in detector size to provide a corresponding increase in output voltage.

The particular characteristics of operational amplifier 308, feedback capacitor $C_i$ and reset transistor 306 may vary depending upon the requirements of a particular application. According to one embodiment of the invention, operational amplifier 308 is configured with an open loop gain of about 25 dB to about 50 dB, a unity gain bandwidth of about 1 MHz to about 1 GHz and a noise figure of about 1 dB to about 4 dB and feedback capacitor $C_1$ is about 5 fF to about 100 fF.

According to another embodiment of the invention, operational amplifier 308 is configured with an open loop gain of about 20 dB to about 30 dB, a unity gain bandwidth of about 10 MHz and a noise figure of about 2 dB to about 3 dB and feedback capacitor $C_i$ is about 20 fF to about 30 fF.

Unlike conventional configurations, in arrangement 300, the voltage across photodiode 302 remains constant, thus ensuring that photodiode 302 stays at a constant reverse bias. Since the quantum efficiency of the photodiode 302, i.e. the rate of charges produced by incident photons, varies with the reverse bias voltage $V_G$, it is beneficial to set the reverse bias voltage $V_G$ to a known value to allow a precise estimate of the sensitivity of detection arrangement 300.

Figure 5A:
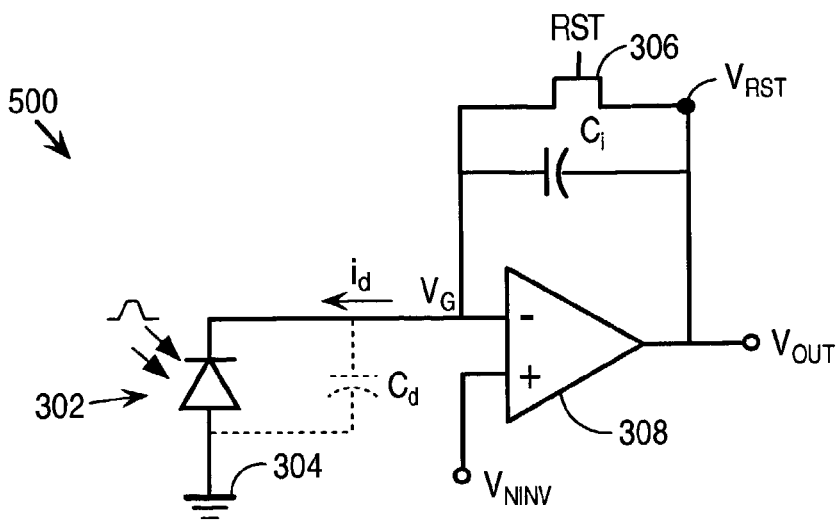
FIG. 5A is a block diagram that depicts a photodiode arrangement according to another embodiment of the invention.
Figure 5B:
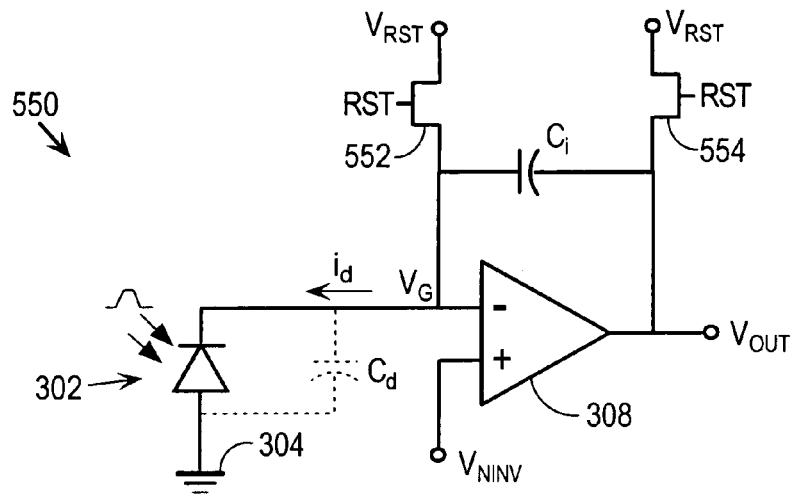
FIG. 5B is a block diagram that depicts a photodiode arrangement according to yet another embodiment of the invention.

The approach described herein for addressing parasitic capacitances in photodiode arrangements is not limited to the particular circuit arrangement 300 depicted in FIG. 3 and many different configurations are possible depending upon the requirements of a particular application. For example, FIG. 5A is a block diagram that depicts a photodiode arrangement 500 according to another embodiment of the invention. In arrangement 500, reset transistor 306 is connected in parallel with feedback capacitor $C_1$ between the output $V_{OUT}$ and inverting input of operational amplifier 308. As another example, FIG. 5B is a block diagram that depicts a photodiode arrangement 550 according to yet another embodiment of the invention. In arrangement 550, a first reset transistor 552 is connected to the inverting input of operational amplifier 308 and a second reset transistor 554 is connected to the output $V_{OUT}$ of operational amplifier 308.

3. Capacitance Structures

A variety of capacitance structures may be used to implement feedback capacitor $C_1$, depending upon the requirements of a particular application, and the invention is not limited to any particular capacitance structure. If the width of the pulse $T_H$ is limited by average power constraints and safety considerations, as in the case of laser pulses, a detectable output voltage $V_{OUT}(T_H)$ is attainable only when feedback capacitor $C_i$ is sufficiently small and/or $I_d$ is sufficiently large. Feedback capacitor $C_1$ usually can be made arbitrarily small, however, below a certain limit it may be difficult to ensure a limited tolerance. Hence, the gain of the preamplifier may become highly sensitive on technological variations. Moreover, if such a circuitry needs be implemented in any matrix of identical such components, e.g., pixel cell arrangements, it may become difficult to limit gain and thus sensitivity mismatches between various cells.

Figure 6:
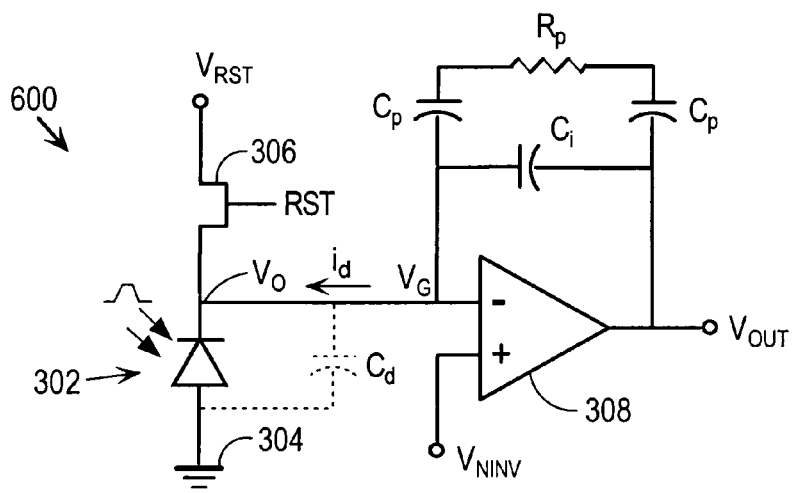
FIG. 6 is a block diagram that depicts a photodiode arrangement with modeled parasitic capacitances.

FIG. 6 is a block diagram that depicts a photodiode arrangement with modeled parasitic capacitances. Because of the additional parasitic capacitances, represented by capacitors $C_p$, the actual effective capacitance $C_{1\_eff}$ of feedback capacitor $C_i$, may be significantly larger than feedback capacitor $C_1$ alone, thus reducing the total gain of operational amplifier 308. Three approaches for addressing a limited gain problem include shielding the feedback capacitor $C_i$, implementing the feedback capacitor $C_1$ as an array of capacitors and increasing the current of photodiode 302.

A. Shielding the Feedback Capacitor $C_1$

Figure 7:
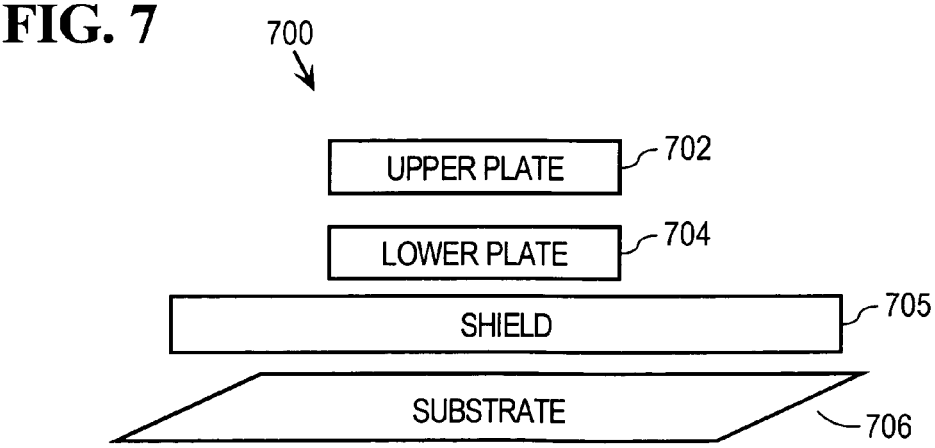
FIG. 7 is a block diagram that depicts an arrangement for shielding a feedback capacitor according to an embodiment of the invention.

FIG. 7 is a block diagram that depicts an arrangement 700 for shielding the feedback capacitor $C_i$ according to an embodiment of the invention. In arrangement 700, feedback capacitor $C_i$ includes an upper plate 702 and a lower plate 704. Upper plate 702 is connected to the inverting input of operational amplifier 308 and lower plate 704 is connected to the output $V_{OUT}$ of operational amplifier 308. In arrangement 700, upper plate 702 and lower plate 704 are shielded from a substrate 706 by a shield 705. Shielding the feedback capacitor $C_i$ reduces parasitic capacitances coupling either the output $V_{OUT}$ and/or the inverting input of operational amplifier 308 with ground. This, in turn, improves the reproducibility of circuit performance.

B. Implementing the Feedback Capacitor $C_1$ as an Array of Capacitors

Figure 8:
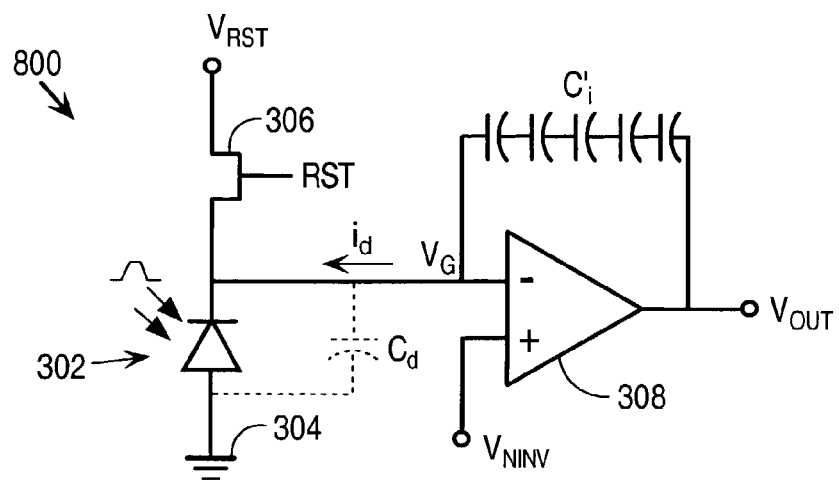
FIG. 8 is a block diagram of a photodiode arrangement with a feedback capacitor implemented as an array of large capacitors, in accordance with an embodiment of the invention.

According to another embodiment of the invention, the feedback capacitor Ci is implemented as an array of large capacitors, as depicted in the arrangement 800 of FIG. 8. In arrangement 800, the total feedback capacitance $C_1=C'_1/n$, where n is the number of components. As a result of the capacitance division, the variability of the feedback capacitance $C_i$ attributable to technology parameters is also reduced. The feedback capacitor components may also be shielded to further improve the reproducibility of the feedback capacitor array.

C. Increasing the Photodiode Current

The current $I_d$ generated by photodiode 302 is generally proportional to the area of photodiode 302. The parasitic capacitance $C_d$ of photodiodes is conventionally proportional to the area of the photodiode. Thus, increasing the area of the photodiode provides limited improvements in gain and typically includes a performance penalty in the form of longer integration times. In embodiments of the invention described herein, the parasitic capacitance of photodiode 302 is reduced or cancelled via capacitive feedback. Hence, relatively large photodiodes may be employed to provide increased gain without seriously compromising the speed of the detection system.

4. Noise Cancellation

In some situations, the activation of a reset switch, such as reset transistor 306, may produce noise when the switch is opened, i.e., when integration is initiated. Part of this noise is attributable to charge injection and capacitive coupling during the opening and closing of switches. This type of noise is known as systematic noise. Part of the noise is attributable to photonic, 1/f, and kT/C noise. By virtue of the physical nature of semi-conducting PN junctions, most photons reaching the surface of the device penetrate silicon to a wavelength-dependent depth and are absorbed by the material, which in turn generates one or more pairs of positive and negative electrical charges. The charges are accelerated to the device's cathode and the anode respectively. This flow of charges gives rise to a very small current, generally of the order of femto-, pico-, or nano-Amperes. Hence, even sporadic and faint currents can be quite destructive during detection.

Figure 9:
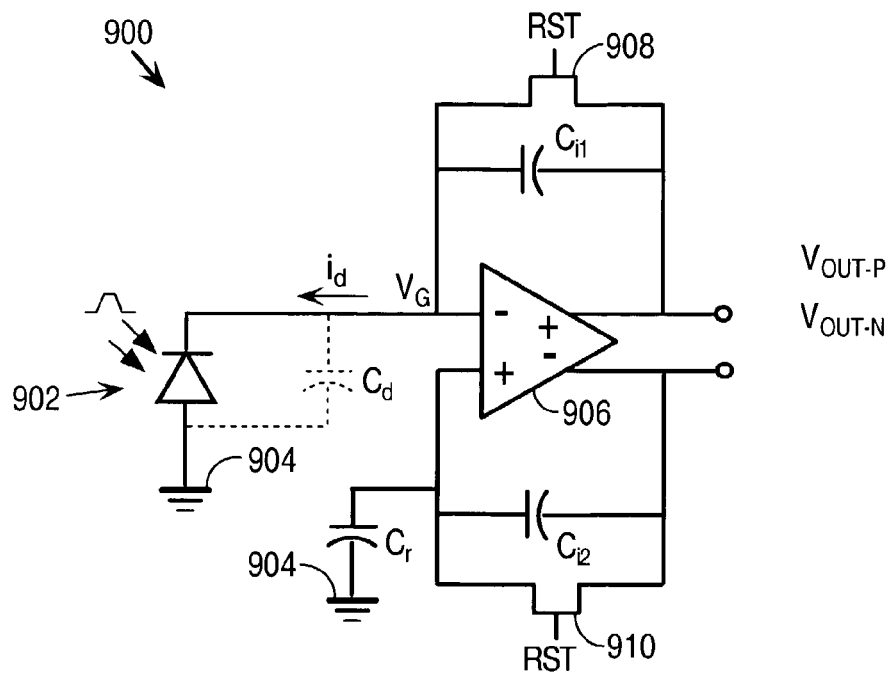
FIG. 9 is a block diagram that depicts of a fully differential photodiode detection architecture according to an embodiment of the invention.

According to one embodiment of the invention, a fully differential architecture is used to reduce or eliminate, at least to the first order, various types of noise in photodiode detection systems. FIG. 9 is a block diagram that depicts a fully differential photodiode detection architecture 900 according to an embodiment of the invention. In architecture 900, a photodiode 902 is connected between a ground potential 904 and an inverting input of an operational amplifier 906. A reset transistor 908 is connected in parallel with a feedback capacitor $C_{i1}$ between the $V_{OUT\text{-}P}$ output and the inverting input of operational amplifier 906. A reset transistor 910 is connected in parallel with a feedback capacitor $C_{i2}$ between the $V_{OUT\text{-}N}$ output and the non-inverting input of operational amplifier 906. A reference capacitor $C_r$ is connected between the non-inverting input of operational amplifier 906 and the ground potential 904. According to one embodiment of the invention, reference capacitor $C_r$ is the same size of the sum of all capacitors present at the inverting input of operational amplifier 906. The output of operational amplifier 906 is determined by the difference $V_{OUT\text{-}P} - V_{OUT\text{-}N}$. The fully differential architecture 900 is also effective in reducing noise originating in supply lines (positive and/or negative). Non-systematic sources of noise, 1/f, kT/C, and photonic noise, can be attenuated using very specific design practices described hereafter.

1/f noise is reduced through the use of PMOS transistors at the input of the operational amplifier 906 and all the active elements connected to the inverting input of operational amplifier 906. kT/C noise is generated when the RST signal changes state and all the components in the architecture 900 are released from their reset state. When a pulse of light is received, the photodiode current is integrated for the duration of the pulse $T_H$ or the duration of the integration time $t_1$, whichever is less. Superimposed to that signal, however, is an offset voltage. The offset voltage is a random variable with an average of zero and a standard deviation of $\sqrt{kT/C_i}$, where k is the Boltzmann constant and T is the absolute temperature. Due to the statistical nature of this offset voltage, it is impossible to predict its exact value a priori. It is possible, however, to sample and cancel the offset voltage before a light pulse is to be detected.

Figure 10:
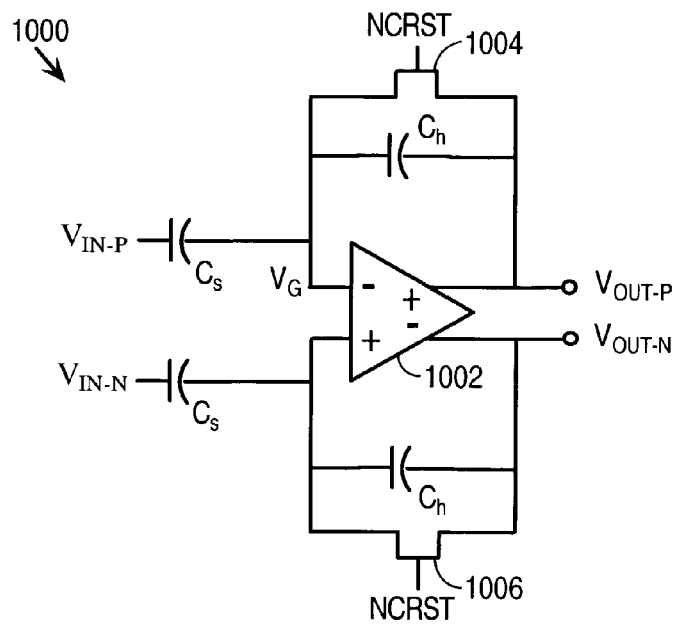
FIG. 10 is a block diagram that depicts a fully differential photodiode architecture for implementing a noise cancellation scheme according to an embodiment of the invention.

FIG. 10 is a block diagram that depicts a fully differential architecture 1000 for implementing a noise cancellation scheme according to another embodiment of the invention. A similar architecture may be used in single-ended mode. When the noise cancellation reset signal NCRST is de-asserted, which in this example is a logic LOW, the voltage at the input $V_{IN\text{-}P}(t_0) - V_{IN\text{-}N}(t_0)$, which may include kT/C and other noise components, is sampled by capacitors $C_s$. Advantageously, offset voltage $V_{off}$, i.e. the intrinsic offset voltage of the amplifier, is also sampled. When reset transistors 1004, 1006 stop conducting (open) at time $t_0$, the sampled voltage is added to the amplification of the input signal according to the following equation:

$$V_{OUT\text{-}P}(t) - V_{OUT\text{-}N}(t) = -(C_s/C_h)[V_{IN\text{-}P}(t) - V_{IN\text{-}N}(t) + V_{IN\text{-}N}(t_0) - V_{IN\text{-}P}(t_0) - V_{OFF}], \quad (5)$$

where $V_{OUT\text{-}P}(t) - V_{OUT\text{-}N}(t)$ is the voltage at the output of the noise cancellation stage (architecture 1000). The kT/C noise produced by the opening of the reset transistors 1004, 1006, if referred to the input, is reduced by the gain of architecture 1000. For example, if $C_s/C_h = 10$, then the standard deviation of this noise source, referred back to the input of architecture 1000, is reduced to 10% of kT/Ch.

Photonic noise is directly proportional to the integration time $t_i$. Reducing $t_i$ is effectively equivalent to increasing the detection speed.

5. Capacitive Feedback Combined With Noise Cancellation

Figure 11:
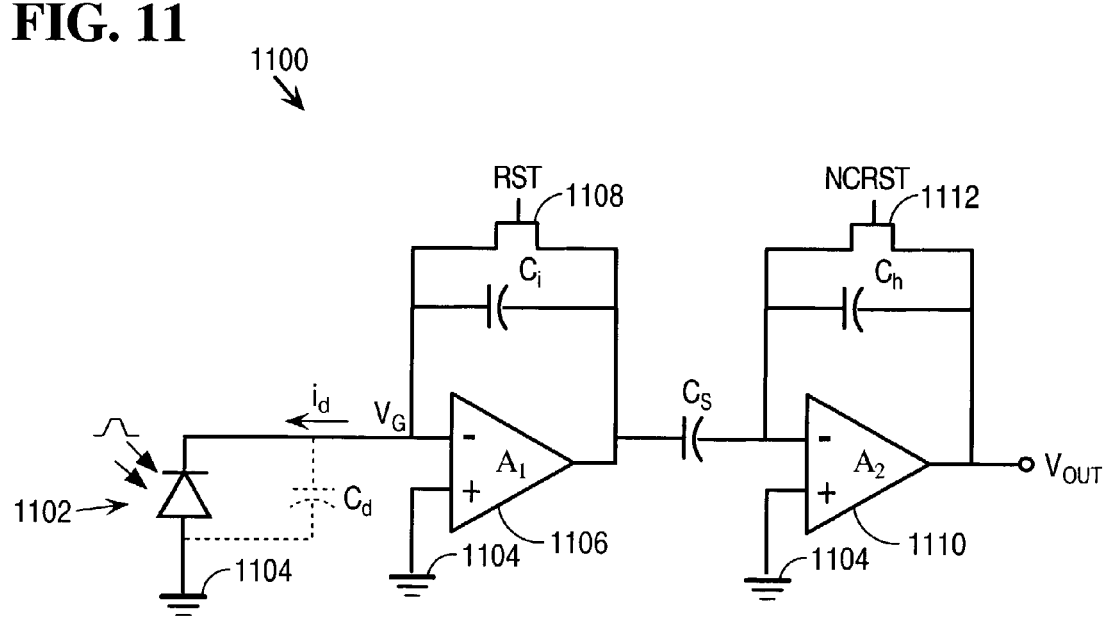
FIG. 11 is a block diagram that depicts a photodiode arrangement with circuitry for reducing or canceling the effects of parasitic capacitances in a photodiode and for providing noise cancellation, according to an embodiment of the invention.

FIG. 11 is a block diagram that depicts a photodiode arrangement 1100 with both circuitry for reducing or canceling the effects of parasitic capacitances in a photodiode and for providing noise cancellation, according to an embodiment of the invention. It is understood that the single-ended configuration of arrangement 1100 may be implemented in a double-ended configuration.

In arrangement 1100, a photodiode 1102 is coupled between a ground potential 1104 and the inverting input of an operational amplifier 1106. A feedback capacitor $C_1$ and a reset transistor 1108 are connected in parallel between the output and the inverting input of operational amplifier 1106. The output of operational amplifier 1106 is connected to the inverting input of another operational amplifier 1110 via a cancellation capacitor $C_s$. A capacitor $C_h$ and a reset transistor 1112 are connected in parallel between the output and the inverting input of operational amplifier 1110.

In operation, assuming that a pulse of constant current $I_d$ is generated by photodiode 1102, the theoretical single-ended gain per unit time $V_G/(I_d t)$ for the first stage is $V_G/(I_d t) = A_1/(1 - A_1)C_1$, where $A_1$ is the single-ended LFG of operational amplifier 1106. It is also assumed that operational amplifier 1106 is operating well below its unity gain bandwidth and within applicable slew rate constraints. Selecting a small value for feedback capacitor $C_1$ provides an increase in the signal-to-noise-ratio (SNR) of the first stage, estimated as:

$$SNR = 10 \log [(1/C_1^2)/(kT/C_1)] = -10 \log [kTC_i] \quad (6)$$

For considerations discussed earlier, however, there are practical limitationson how small of a value may be used for feedback capacitor $C_i$. Parasitic capacitances, both linear (interconnect) and non-linear (junctions) will dominate for values of feedback capacitor of less than about 3 to about 5 fF. However the techniques described herein may allow smaller values for feedback capacitor $C_i$, for example, less than 1 fF.

When the RST signal is de-asserted, the kT/C noise voltage present at the output of operational amplifier 1106 through cancellation capacitor $C_s$ and held across capacitor $C_h$. The kT/C noise produced by turning OFF reset transistor 1108 is cancelled exactly, assuming a fully balanced circuit and no other sources of noise. The kT/C noise produced by turning OFF reset transistor 1112 will still be present, but dependent on $C_h$ and not $C_1$. It is generally desirable to select the value of cancellation capacitor $C_s$ to be as large as possible to minimize charge-sharing effects and discharge errors. According to one embodiment of the invention, the value of cancellation capacitor $C_s$ is selected to be greater than the value of capacitor $C_h$ to add a gain factor and increase the overall SNR.

If this reset scheme is used, then $N_s$ can be excluded, hence the total SNR is dominated by photonic noise $N_\varphi$. Independent of the integration or amplification apparatus being used, $N_{100}$ is computed in terms of the variance of the charge that is detected at photodiode 1102 and amplified by the first stage as:

$$N_{100} = G^2 e^2 E \quad (7)$$

where $e=1.6\times10^{-19}$ Coulombs is the charge of an electron and E is the number of detected electrons. Thus, the resulting signal-to-noise ratio is approximated by:

$$SNR \approx 10\, Log(E) \quad (8)$$

which is only dependent on the number of detected photons.

6. Implementation Mechanisms

The various embodiments of the invention described herein may be implemented as a stand-alone mechanism, such as a module or stage, that is coupled to a detector, or integrated into a detector arrangement. The approach may be implemented using discrete components or as an integrated circuit, and the invention is not limited to any particular implementation.

The approach described herein for detecting EM waves provides several benefits. Decoupling the area and parasitic capacitance of a detector using the approach described herein allows an increase in detector size to provide a corresponding increase in gain and output voltage. Furthermore, acquisition times are reduced at little or no cost of reducing the sensitivity of the detector. As a result, the approach is particularly useful in applications where an extremely short and dim pulse of light must be discriminated and where relatively high detection speed is beneficial. The approach provides superior cancellation of all sources of noise, at least to the first order, by proper selection of parameters of the design. Furthermore, the approach provides improved reproducibility and higher yield through the use of a well-controlled linear component instead of a high variable, and difficult to control, parasitic component. The approach also reduces noise effects by eliminating resistors that are used in conventional photodiode preamplifiers.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electromagnetic radiation detector comprising:
   a detector configured to detect electromagnetic radiation;
   an amplifier stage coupled to the detector, the amplifier stage including:
      an operational amplifier having an inverting input and an output, wherein the detector is connected to the inverting input of the operational amplifier and the operational amplifier has a open loop gain of about 25 dB to about 50 dB and a unity gain bandwidth of about 1 MHz to about 1 GHz, and
      a capacitive structure coupled between the output and the inverting input of the operational amplifier to cancel at least a portion of an intrinsic capacitance of the detector, wherein the capacitive structure has a capacitance of about 5 fF to about 100 fF; and
   a biasing stage coupled to the detector and the amplifier stage, wherein the biasing stage is configured to apply a voltage to the amplifier stage to charge the capacitive feedback and to reverse bias the detector; and
   wherein characteristics of at least one of said capacitive feedback and said amplifier stage cause a reduction in at least one of 1/f noise and kT/C noise in said electromagnetic radiation detector.

2. The electromagnetic radiation detector as recited in claim 1, wherein the biasing stage includes a switch coupled between a voltage source and the amplifier stage.

3. The electromagnetic radiation detector as recited in claim 1, wherein:
   the operational amplifier has a open loop gain of about 20 dB to about 30 dB and a unity gain bandwidth of about 10 MHz, and
   the capacitive structure has a capacitance of about 20 fF to about 30 fF.

4. The electromagnetic radiation detector as recited in claim 1, wherein the detector is a photodiode.

5. The electromagnetic radiation detector as recited in claim 1, wherein the detector is a photogate.

6. The electromagnetic radiation detector as recited in claim 1, further comprising a noise reduction stage connected to the amplifier stage and being configured to at least reduce noise present at the output of the amplifier stage.

7. An electromagnetic radiation detector comprising:
   an operational amplifier having an inverting input, a non-inverting input and an output, wherein the operational amplifier has a open loop gain of about 25 dB to about 50 dB and a unity gain bandwidth of about 1 MHz to about 1 GHz;
   a capacitance structure coupled between the output and the inverting input of the operational amplifier, wherein the capacitive structure has a capacitance of about 5 fF to about 100 fF; and
   a transistor coupled between the inverting input of the operational amplifier and a voltage source to selectively apply a voltage to the inverting input of the operational amplifier to cause the capacitance structure to be charged and to reverse bias a photodetector coupled to the inverting input of the operational amplifier; and
   wherein characteristics of at least one of said capacitive structure and said operational amplifier cause a reduction in at least one of 1/f noise and kT/C noise in said electromagnetic detector.

8. The electromagnetic radiation detector as recited in claim 7, wherein a voltage is applied to the non-inverting input of the operational amplifier that is approximately equal to the voltage source voltage.

9. The electromagnetic radiation detector as recited in claim 7, wherein the capacitance structure is a shielded capacitance structure that reduces parasitic capacitances coupling either the output of the operational amplifier to a ground potential or the inverting input of the operational amplifier to the ground potential.

10. The electromagnetic radiation detector as recited in claim 7, wherein the capacitance structure is at least two capacitors coupled in series.

11. The electromagnetic radiation detector as recited in claim 7, wherein:
the operational amplifier has a open loop gain of about 20 dB to about 30 dB and a unity gain bandwidth of about 10 MHz, and
the capacitive structure has a capacitance of about 20 fF to about 30 fF.

12. The electromagnetic radiation detector as recited in claim 7, further comprising a noise reduction stage connected to the operational amplifier and being configured to at least reduce noise present at the output of the operational amplifier.

13. The electromagnetic radiation detector as recited in claim 7, wherein the photodetector is a photodiode.

14. The electromagnetic radiation detector as recited in claim 7, wherein the photodetector is a photogate.

15. A method of reducing at least 1/f and kT/C noise in an electromagnetic radiation detector, the method comprising:
disposing an operational amplifier having an inverting input coupled to receive output from a photodetector, and also having an open loop gain of about 25 dB to about 50 dB and a unity gain bandwidth of about 1 MHz to about 1 GHz;
coupling a feedback capacitor between an output of the operational amplifier and the inverting input of the operational amplifier, the feedback capacitor having a capacitance of about 5 fF to about 100 fF;
coupling a source of bias potential so as to reverse bias said electromagnetic detector and to provide charge to the feedback capacitor;
wherein characteristics of at least one of the feedback capacitor and the operational amplifier cause a reduction of at least one of 1/f noise and kT/C noise in the electromagnetic detector.

* * * * *